(12) United States Patent
Chuang et al.

(10) Patent No.: US 12,319,202 B2
(45) Date of Patent: Jun. 3, 2025

(54) AROUND VIEW MONITORING SYSTEM FOR VEHICLE

(71) Applicant: LianLi AutoVision Co., Ltd., HsinChu (TW)

(72) Inventors: Ying-Chih Chuang, Taichung (TW); Han-Yun Chen, Hsinchu County (TW); Chiao-Yu Chen, Taoyuan (TW)

(73) Assignee: LianLi AutoVision Co., Ltd., HsinChu (TW)

( * ) Notice: Subject to any disclaimer, the term of this patent is extended or adjusted under 35 U.S.C. 154(b) by 107 days.

(21) Appl. No.: 18/144,855

(22) Filed: May 9, 2023

(65) Prior Publication Data
US 2023/0365063 A1   Nov. 16, 2023

(30) Foreign Application Priority Data
May 10, 2022 (TW) .................................. 111117518

(51) Int. Cl.
*B60R 1/27*   (2022.01)
(52) U.S. Cl.
CPC .......... *B60R 1/27* (2022.01); *B60R 2300/105* (2013.01); *B60R 2300/303* (2013.01); *B60R 2300/402* (2013.01)
(58) Field of Classification Search
CPC ............... B60R 2300/105; B60R 1/27; B60R 2300/303; B60R 2300/402; G06T 2207/30252; G06T 2207/30232; G06V 20/52; G06V 20/56; B60K 2370/21

USPC ................................................. 348/148, 143
See application file for complete search history.

(56) References Cited

U.S. PATENT DOCUMENTS

| | | | |
|---|---|---|---|
| 2012/0154586 A1* | 6/2012 | Chung ................ | H04N 17/002 348/148 |
| 2013/0100290 A1* | 4/2013 | Sato ......................... | G06T 7/80 348/148 |

FOREIGN PATENT DOCUMENTS

| | | |
|---|---|---|
| TW | 201226237 A1 | 7/2012 |
| TW | M578660 U | 6/2019 |

* cited by examiner

*Primary Examiner* — Sherrie Hsia

(57) ABSTRACT

An around view monitoring system for a vehicle includes cameras, an image processing unit and an integrated control unit. The cameras are configured to shoot peripheral images of the vehicle. The image processing unit is connected to the cameras and is configured to receive the peripheral images of the vehicle. The integrated control unit is connected to the image processing unit, and is configured to select predetermined relevant parameters of the vehicle to calibrate and splice the peripheral images so as to form around view monitoring images and to output the corresponding around view monitoring images according to the type of the vehicle. Therefore, the around view monitoring system can provide proper and corresponding around view monitoring images according to different types of vehicles.

16 Claims, 5 Drawing Sheets

AROUND VIEW MONITORING SYSTEM FOR VEHICLE

FIELD OF THE INVENTION

The present invention relates to an around view monitoring system, and particularly to an around view monitoring system suitable for different types of vehicles.

BACKGROUND OF THE INVENTION

There have been various around view monitoring systems on the market, but each kind of around view monitoring system is customized for the same type of vehicles, and thus are not suitable for different types of vehicles. For example, the around view monitoring system for a passenger car may not be suitable for buses, trucks, box trucks, heavy duty trucks and even boats. Therefore, it is necessary to provide an around view monitoring system suitable for various vehicles.

SUMMARY OF THE INVENTION

The present invention provides an around view monitoring system for a vehicle. By providing relevant parameters of different types of vehicles, the calibrating personnels can select relevant parameters of corresponding vehicles, particularly the types of the vehicles, to calibrate and splice the around view monitoring images of the corresponding vehicles. Therefore, the around view monitoring system for a vehicle provided by the present invention can provide proper and corresponding around view monitoring images for different types of vehicles.

The around view monitoring system for a vehicle provided by the present invention includes a plurality of cameras, an image processing unit and an integrated control unit. The plurality of cameras include the first camera, the second camera and the third camera arranged on the left side, the right side and the rear side of the vehicle respectively and configured to shoot images on the left side, the right side and the rear side of the vehicle. The image processing unit is connected to the plurality of cameras and is configured to receive the images on the left side, the right side and the rear side of the vehicle. The integrated control unit is connected to the image processing unit and is configured to select predetermined relevant parameters of the vehicle to calibrate and splice the images from the left side, the right side and the rear side of the vehicle so as to generate calibrated relevant parameters of the vehicle and to output the corresponding around view monitoring images according to the type of the vehicle.

In an embodiment of the present invention, the cameras include a fourth camera, the fourth camera being arranged in the front side of the vehicle to shoot front image of the vehicle. The image processing unit is connected to the plurality of cameras and is configured to receive the images from the front side, the left side, the right side and the rear side of the vehicle. The image processing unit is configured to select the predetermined relevant parameters of the vehicle to calibrate and splice the images from the front side, the left side, the right side and the rear side of the vehicle to generate the calibrated relevant parameters of the vehicle and to output the corresponding around view monitoring images according to the type of the vehicle.

In an embodiment of the present invention, the around view monitoring system further includes a Universal Serial Bus (USB) interface. The USB interface is connected to the integrated control unit and an external memory and is configured to load the calibrated relevant parameters of the vehicle from the external memory by the integrated control unit through the USB interface so as to output the corresponding around view monitoring images according to the type of the vehicle or to store the calibrated relevant parameters of the vehicle to the external memory by the integrated control unit through the USB interface.

In an embodiment of the present invention, the around view monitoring system further includes a storage unit. The storage unit is connected to the integrated control unit and is configured to store the predetermined relevant parameters and the calibrated relevant parameters of the vehicle.

In an embodiment of the present invention, the around view monitoring system further includes a multimedia device. The multimedia device is connected to the integrated control unit and is configured to display a user interface so as to display the corresponding around view monitoring images and provide selection of various around view monitoring images.

In an embodiment of the present invention, the calibrated relevant parameters of the vehicle at least include the type of the vehicle, the size of a calibrated site after calibration, the size of a calibrated pattern after calibration and a calibration result.

In an embodiment of the present invention, the predetermined relevant parameters of the vehicle at least include the type of the vehicle, the size of the calibrated site and the size of the calibrated pattern.

In an embodiment of the present invention, the type of the vehicle at least includes a bus, a semi-trailer, a box truck, a heavy-duty truck and a boat.

In an embodiment of the present invention, the around view monitoring system further includes a Universal Asynchronous Receiver/Transmitter (UART) interface. The UART is connected to the integrated control unit and a Control Area Network Bus (CAN Bus) of the vehicle and is configured to control the integrated control unit to receive vehicle information from the CAN Bus of the vehicle through the UART interface.

In an embodiment of the present invention, the around view monitoring system further includes a micro-controller unit. The micro-controller unit is connected to the integrated control unit through a UART interface, the micro-controller unit including a storage unit configured to store the calibrated relevant parameters of the vehicle.

By providing relevant parameters of different types of vehicles, calibrating personnels can select relevant parameters of corresponding vehicles, particularly the types of the vehicles, to calibrate and splice the around view monitoring images of the corresponding vehicles, and therefore, the around view monitoring system for a vehicle provided by the present invention can provide proper and corresponding around view monitoring images for different types of vehicles. In addition, the around view monitoring system for a vehicle provided by the present invention further can store the calibrated relevant parameters of the vehicle in the external memory or the micro-controller unit to load the calibrated relevant parameters through the external memory or is connected to the integrated control unit through the UART interface to load the calibrated relevant parameters in the around view monitoring system of another vehicle of the same type of the vehicle without calibrating and splicing the images again, so that the image calibrating and splicing times are saved.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF PREFERRED EMBODIMENTS

Figure 1:
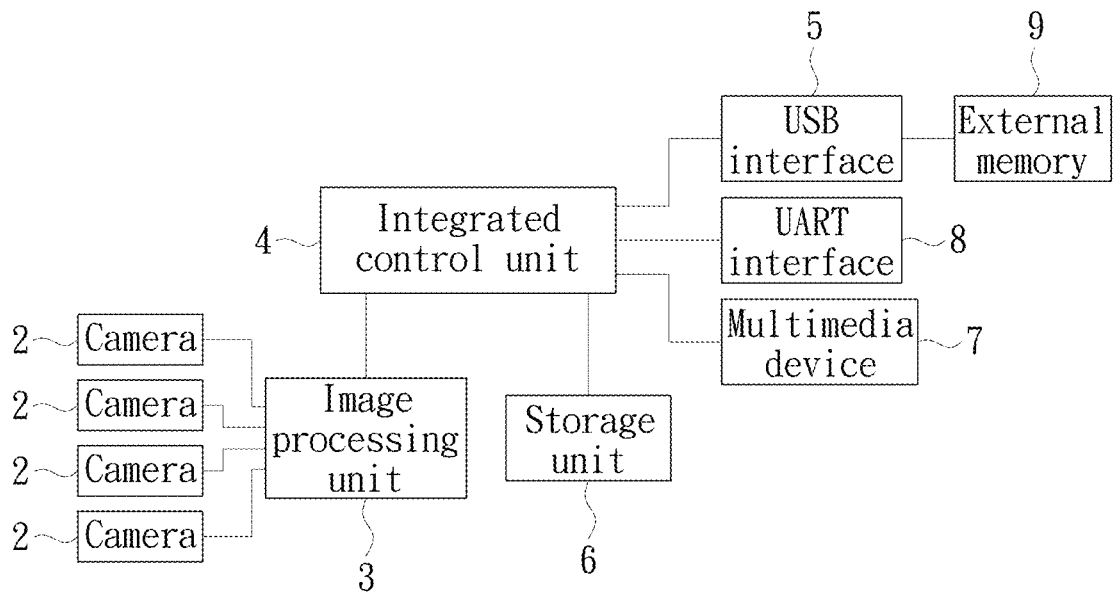
FIG. 1 is a block diagram of an around view monitoring system for a vehicle provided by an embodiment of the present invention.

As shown in FIG. 1, it is a block diagram of an around view monitoring system for a vehicle provided by an embodiment of the present invention. The around view monitoring system 1 includes a plurality of cameras 2, an image processing unit 3, an integrated control unit 4, a Universal Serial Bus (USB) interface 5, a storage unit 6 and a multimedia device 7, wherein the image processing unit 3 is connected to the plurality of cameras 2, and the integrated control unit 4 is connected to the image processing unit 3, the USB interface 5, the storage unit 6 and the multimedia device 7. However, one thing to be noted is that the around view monitoring system provided by the present invention in FIG. 1 is merely for illustrative purposes. The around view monitoring system provided by the present invention can further optionally include other interfaces such as a Universal Asynchronous Receiver/Transmitter (UART) interface 8, a General Purpose Input/Output (GPIO) interface and other hardware devices such as an accelerometer (G-sensor).

Figure 2:
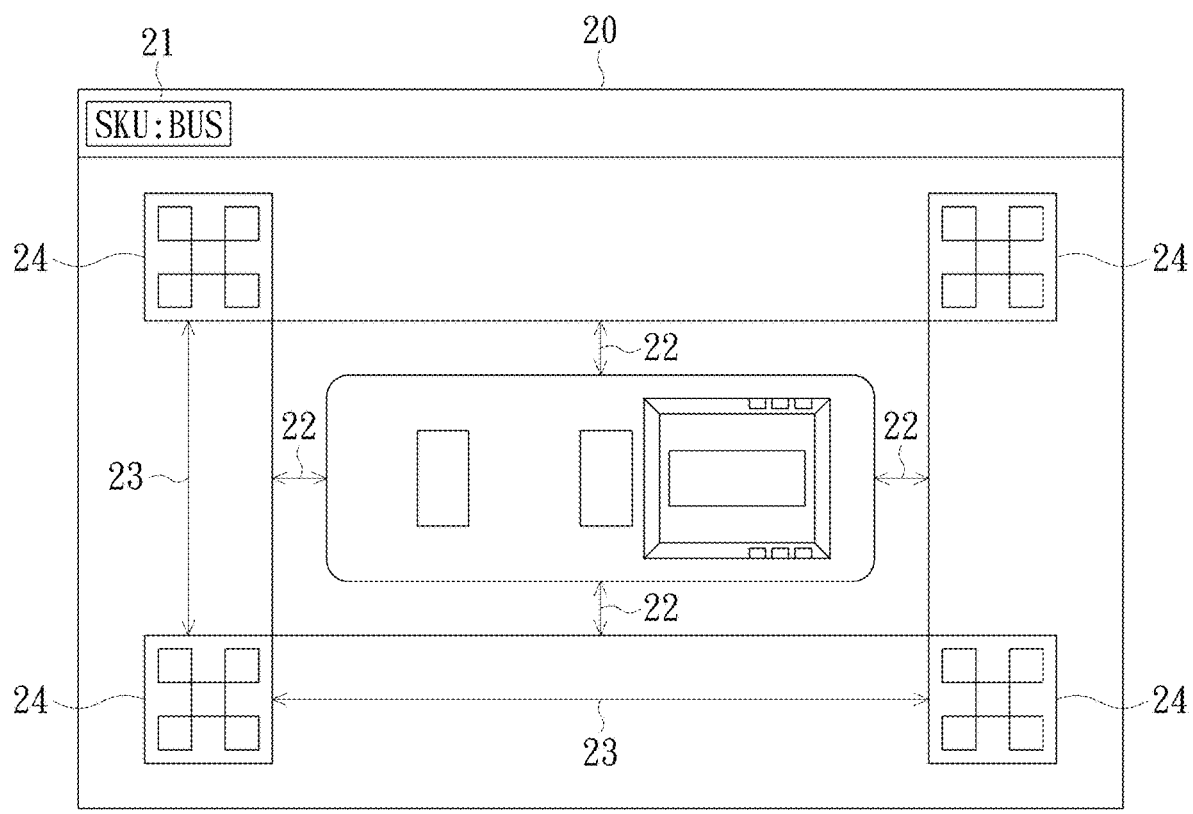
FIG. 2 is a schematic diagram of a user interface provided by an embodiment of the present invention.

In this embodiment, the plurality of cameras 2 include three cameras 2 such as a first camera 2, a second camera 2 and a third camera 2. Theses cameras can be arranged on a vehicle such as a trailer dragged by a semi-trailer. Specifically, the cameras 2 are arranged on the left side, the right side and the rear side of a trailer, so as to shoot images from the left side, the right side and the rear side of the trailer. The image processing unit 3 is configured to receive the images from the left side, the right side and the rear side of the trailer from the cameras 2. The integrated control unit 4 is configured to provide predetermined relevant parameters of the trailer stored by the storage unit 6 on the user interface 20 displayed by the multimedia device 7, so that the calibrating personnels manually select or the integrated control unit 4 automatically selects the parameters to calibrate and splice the images from the left side, the right side and the rear side of the trailer so as to generate the calibrated relevant parameters of the trailer, wherein the predetermined relevant parameters may include the type 21 of the vehicle, the size of the vehicle (such as the length and width of the vehicle), the number of the vehicle (such as the body number of the vehicle and/or the license plate number of the vehicle), the sizes 22 and 23 of the calibrated site (the length and width of the calibrated site, and the length and width differences between the vehicle and the calibrated site) and the size 24 of the calibrated pattern (such as the length and width of the calibrated pattern, and the length and width of the pattern), as shown in the schematic diagram of the user interface in FIG. 2. It is to be noted that the type of the vehicle at least includes a bus, a semi-trailer, a box truck, a heavy duty truck and a boat. That is, the type of the vehicle is merely for illustrative purposes, and those skilled in the art shall understand that the various types of vehicles can also be applied to the around view monitoring system for a vehicle provided by the present invention. Note that the displayed image of the around view could vary with the type of the vehicle. For example, around view images in different styles can be displayed for different types of vehicles, and the color, contour, size, etc. of the vehicle shown in the around view may change based on the model of the vehicle.

Figure 4:
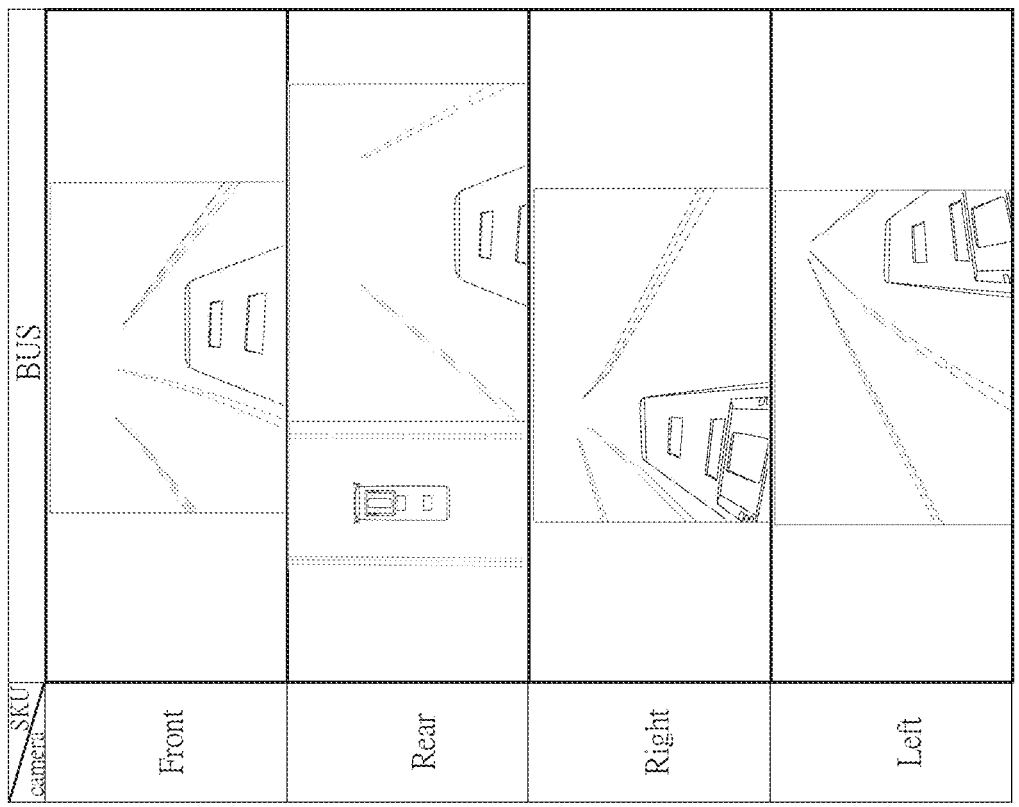
FIG. 4 is a schematic diagram of around view monitoring images of a semi-trailer provided by an embodiment of the present invention.
Figure 5:
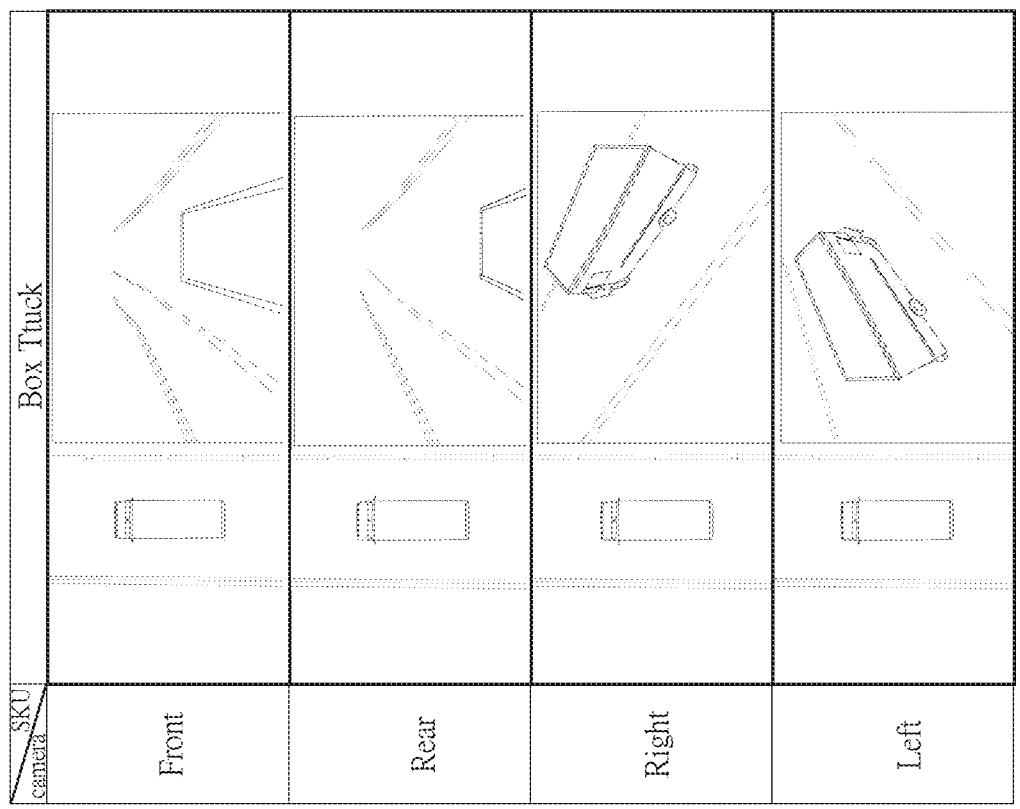
FIG. 5 is a schematic diagram of around view monitoring images of a box truck provided by an embodiment of the present invention.
Figure 7:
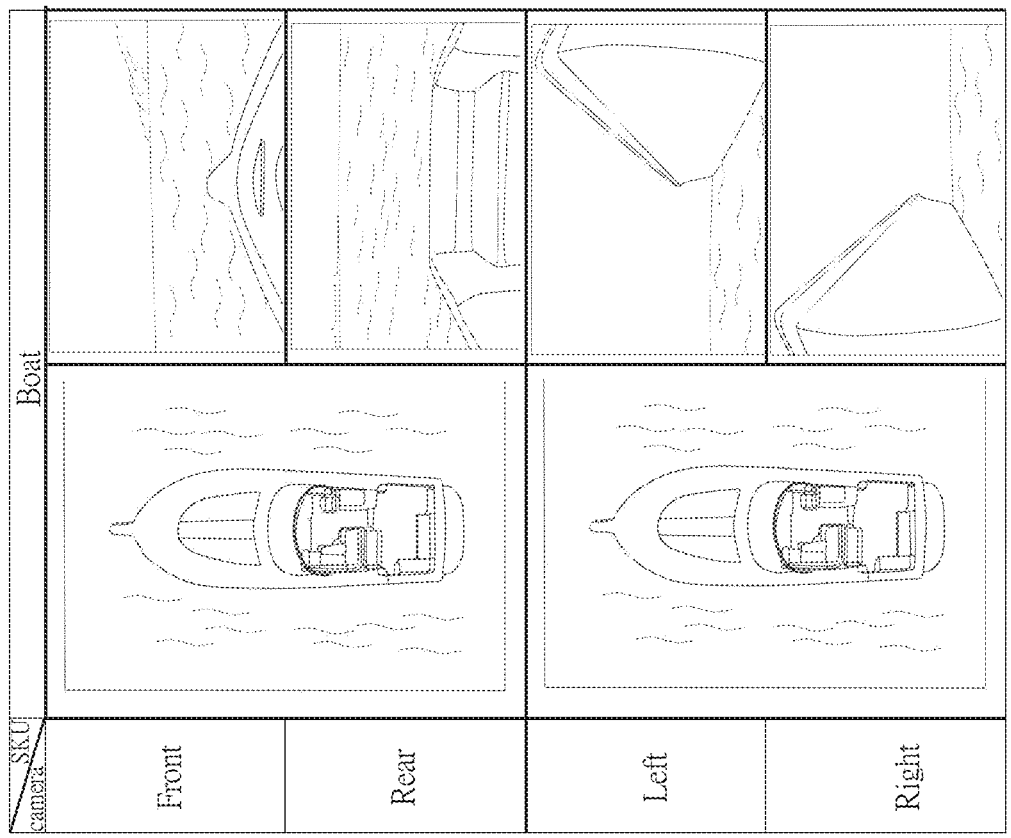
FIG. 7 is a schematic diagram of around view monitoring images of a boat provided by an embodiment of the present invention.
Figure 6:
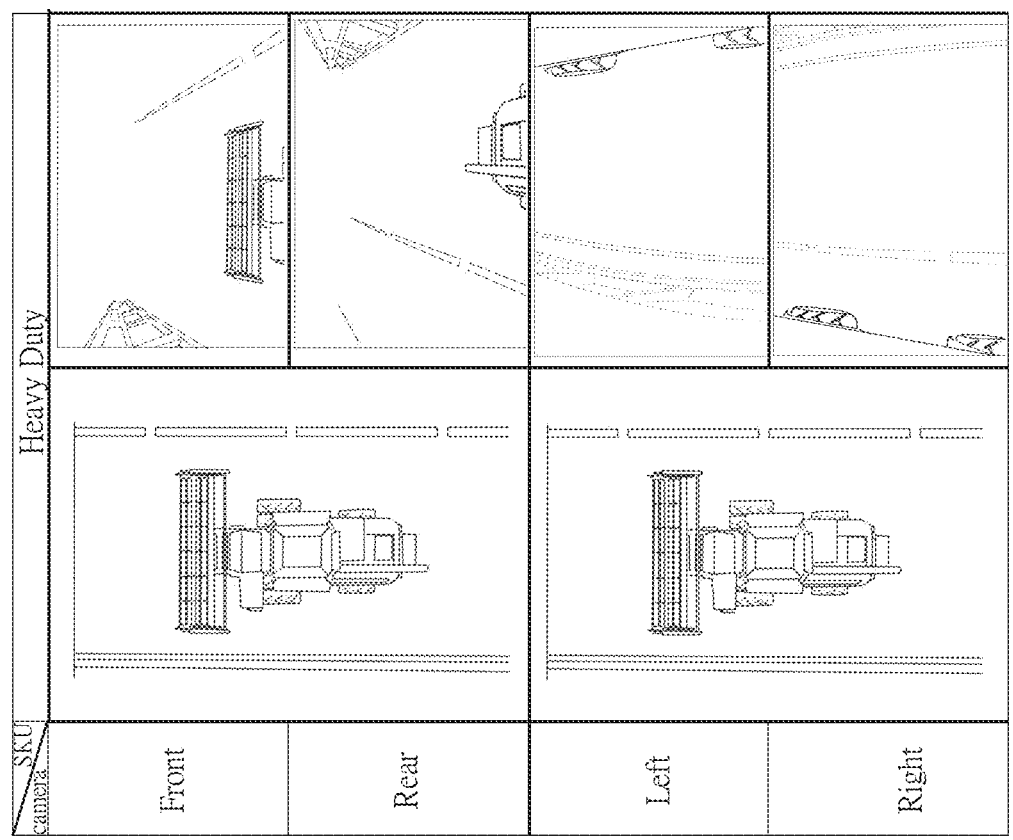
FIG. 6 is a schematic diagram of around view monitoring images of a heavy-duty truck provided by an embodiment of the present invention.

After the default relevant parameters are selected through the user interface 20, the integrated control unit 4 enters a stage of calibrating and splicing the images from the left side, the right side and the rear side of the vehicle. After the integrated control unit 4 completes the stage of calibrating and splicing the images from the left side, the right side and the rear side of the vehicle, the integrated control unit 4 can generate and store the calibrated relevant parameters of the trailer in the storage unit 6 and generate the around view monitoring images of the trailer on the multimedia device 7, such as the overlooked around view monitoring images from the left side, the right side and the rear side of the vehicle shown in FIG. 4, and further can provide various around view monitoring images for drivers to select, wherein the calibrated relevant parameters may include the type 21 of the vehicle, the size of the vehicle, the number of the vehicle, the sizes 22 and 23 of the calibrated site after calibration, the size 24 of the calibrated pattern after calibration, the calibration result and the like.

Therefore, according to the around view monitoring system for a vehicle provided by the present invention, by providing relevant parameters of different types of vehicles, the calibrating personnels can select relevant parameters of corresponding vehicles, more particularly the types of the vehicles, to calibrate and splice the around view monitoring images of the corresponding vehicles, and therefore, the around view monitoring system for a vehicle provided by the present invention can provide proper and corresponding around view monitoring images for different types of vehicles.

In addition, when the external memory 9 is connected to the USB interface 5, the integrated control unit 4 can store the calibrated relevant parameters of the trailer to the external memory 9 through the USB interface 5, so that when the calibrating personnels calibrate another trailer of the same type, they can connect the external memory to the USB interface 5 of the around view monitoring system 1 of another trailer. Thus, the integrated control unit 4 can load the calibrated relevant parameters of the trailer from the external memory 9 through the USB interface 5 so as to output the corresponding around view monitoring images according to the type of the trailer.

It is to be noted that other parts of the around view monitoring system 1 can be arranged on the head of the semi-trailer which is a different type of vehicle, except for the cameras 2.

That is to say, in the embodiment, the around view monitoring system for a vehicle provided by the present invention can be applied to heads of semi-trailers of different types of vehicles as it can store the calibrated relevant parameters of the trailer of the same type of vehicles. The calibrated relevant parameters are loaded through the external memory without calibrating and splicing the images again, so that the calibrating and splicing times of the around view monitoring images of other heads are saved. In another embodiment, the around view monitoring system 1 for a vehicle provided by the present invention can further include a micro-controller unit, which has a UART interface and includes a storage unit configured to store the calibrated relevant parameters of the trailer. It is definite that the micro-controller unit is arranged on the trailer. When the head of another trailer drags this trailer, the integrated control unit 4 of the around view monitoring system 1 on other trailer heads can be connected to the micro-controller unit of the trailer through the UART interface so as to load the calibrated relevant parameters without calibrating or splicing the images, so that the time for calibrating and splicing the around view monitoring images of the other trailer heads can be saved.

In another embodiment, the plurality of cameras 2 include four cameras 2 such as the first camera 2, the second camera 2, the third camera 2 and the fourth camera 2, and the cameras can be arranged on a vehicle such as a trailer dragged by a bus. Specifically, the cameras 2 are arranged on the front side, the left side, the right side and the rear side of the bus, so as to shoot images from the front side, the left side, the right side and the rear side of the bus. The image processing unit 3 is configured to receive the images from the cameras 2 on the front side, the left side, the right side and the rear side of the bus. The integrated control unit 4 is configured to provide predetermined relevant parameters of the bus stored by the storage unit 6 on the user interface 20 displayed by the multimedia device 7, so that the calibrating personnels may manually select the parameters to calibrate and splice the images from the front side, the left side, the right side and the rear side of the bus, so as to generate the calibrated relevant parameters of the bus, wherein the default relevant parameters can include the type 21 of the vehicle, the size of the vehicle, the number of the vehicle, the sizes 22 and 23 of the calibrated site and the size 24 of the calibrated pattern, as shown in the schematic diagram of the user interface in FIG. 2. The type of the vehicle at least includes a bus, a semi-trailer, a box truck, a heavy duty truck and a boat.

Figure 3:
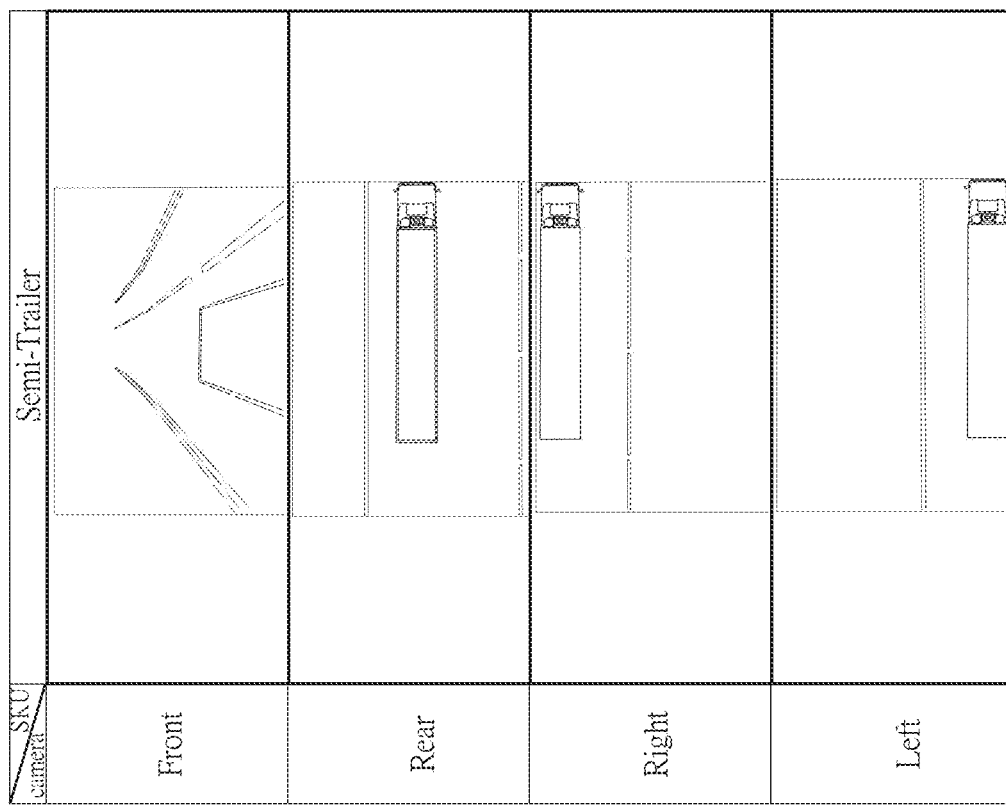
FIG. 3 is a schematic diagram of around view monitoring images of a bus provided by an embodiment of the present invention.

After the default relevant parameters are selected through the user interface 20, the integrated control unit 4 enters a stage of calibrating and splicing the images from the front side, the left side, the right side and the rear side of the bus. After the integrated control unit 4 completes the stage of calibrating and splicing the images from the front side, the left side, the right side and the rear side of the bus, the integrated control unit 4 can generate and store the calibrated relevant parameters of the bus in the storage unit 6 and generate the around view monitoring images of the bus on the multimedia device 7, such as the overlooked around view monitoring images from the front side, the left side, the right side and the rear side of the bus shown in FIG. 3, and further can provide various around view monitoring images for drivers to select, wherein the calibrated relevant parameters can include the type 21 of the vehicle, the size of the vehicle, the number of the vehicle, the sizes 22 and 23 of the calibrated site, the size 24 of the calibrated pattern and the like.

Therefore, according to the around view monitoring system for a vehicle provided by the present invention, by providing relevant parameters of different types of vehicles, the calibrating personnels can select relevant parameters of corresponding vehicles, particularly the types of the vehicles, to calibrate and splice the around view monitoring images of the corresponding vehicles, and therefore, the around view monitoring system for a vehicle provided by the present invention can provide proper and corresponding around view monitoring images for different types of vehicles.

In addition, when the external memory 9 is connected to the USB interface 5, the integrated control unit 4 can store the calibrated relevant parameters of the bus to the external memory 9 through the USB interface 5, so that when the calibrating personnels calibrate another bus of the same type, they can connect the external memory to the USB interface 5 of the around view monitoring system 1 of another bus. Thus, the integrated control unit 4 can load the calibrated relevant parameters of the bus from the external memory 9 through the USB interface 5 so as to output the corresponding around view monitoring images according to the type of the bus.

That is to say, in the embodiment, the around view monitoring system for a vehicle provided by the present invention can be applied to another bus as it can store the calibrated relevant parameters of the bus of the same type of the vehicle. The calibrated relevant parameters are loaded through the external memory without calibrating and splicing the images again, so that the calibrating and splicing times of the around view monitoring images of another bus are saved.

In addition, the around view monitoring system 1 for a vehicle provided by the present invention includes the UART interface 8, connected to the integrated control unit 4 and connected to the CAN Bus, so that the integrated control unit 4 receives all load information from the CAN Bus of the vehicle through the UART interface 8 for display on the multimedia device 7 in combination with the vehicle information.

As shown in FIGS. 3-7, which are block diagrams of around view monitoring images of different types of vehicles provided by the embodiments of the present invention. The around view monitoring system 1 for a vehicle provided by the present invention can provide proper and corresponding default around view monitoring image view angles to the drivers for different types of vehicles, and the drivers also can manually select a preferred around view monitoring image view angle.

In view of the above, according to the around view monitoring system for a vehicle provided by the present invention, by providing relevant parameters of different types of vehicles, the calibrating personnels can select relevant parameters of corresponding vehicles, particularly the types of the vehicles, to calibrate and splice the around view monitoring images of the corresponding vehicles, and therefore, the around view monitoring system for a vehicle provided by the present invention can provide proper and corresponding around view monitoring images for different types of vehicles. In addition, the around view monitoring system for a vehicle provided by the present invention further can store the calibrated relevant parameters of the vehicle in the external memory or the micro-controller unit to load the calibrated relevant parameters through the external memory or is connected to the integrated control unit through the UART interface to load the calibrated relevant parameters in the around view monitoring system of another vehicle of the same type without calibrating and splicing the images again, so that the image calibrating and splicing times are saved.

Although the invention has been described in terms of what is presently considered to be the most practical and preferred embodiments, it can be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An around view monitoring system for a vehicle, comprising:
    a plurality of cameras including a first camera, a second camera and a third camera arranged respectively on a left side, a right side and a rear side of the vehicle, and configured to shoot images from the left side, the right side and the rear side of the vehicle;
    an image processing unit connected to these cameras and configured to receive the images from the left side, the right side and the rear side of the vehicle;
    an integrated control unit connected to the image processing unit and configured to select predetermined relevant parameters of the vehicle to calibrate and splice the images from the left side, the right side and the rear side of the vehicle so as to generate calibrated relevant parameters of the vehicle and to output a corresponding around view monitoring image according to a type of the vehicle; and
    a transmission interface connected to the integrated control unit and an external memory, and configured to load the calibrated relevant parameters of the vehicle from the external memory by the integrated control unit through the transmission interface so as to output the corresponding around view monitoring images according to the type of the vehicle or to store the calibrated relevant parameters of the vehicle to the external memory by the integrated control unit through the transmission interface.

2. The around view monitoring system according to claim 1, wherein the cameras further comprise a fourth camera, the fourth camera being arranged on a front side of the vehicle to shoot images from the front side of the vehicle;
    wherein the image processing unit is connected to these cameras and is configured to receive the images from the front side, the left side, the right side and the rear side of the vehicle; and the integrated control unit is configured to select the predetermined relevant parameters of the vehicle to calibrate and splice the images from the front side, the left side, the right side and the rear side of the vehicle to generate the calibrated relevant parameters of the vehicle and to output the corresponding around view monitoring images according to the type of the vehicle.

3. The around view monitoring system according to claim 2, wherein the transmission interface is a Universal Serial Bus (USB) interface.

4. The around view monitoring system according to claim 2, further comprising:
    a storage unit connected to the integrated control unit, and configured to store the predetermined relevant parameters and the calibrated relevant parameters of the vehicle.

5. The around view monitoring system according to claim 2, further comprising:
    a multimedia device, connected to the integrated control unit and configured to display a user interface so as to display the corresponding around view monitoring images and provide selection of various around view monitoring images.

6. The around view monitoring system according to claim 2, wherein the calibrated relevant parameters of the vehicle at least comprise the type of the vehicle, the size of a calibrated site after calibration, the size of a calibrated pattern after calibration and a calibration result.

7. The around view monitoring system according to claim 2, wherein the predetermined relevant parameters of the vehicle at least comprise the type of the vehicle, the size of the calibrated site and the size of the calibrated pattern.

8. The around view monitoring system according to claim 2, wherein the type of the vehicle at least comprises a bus, a semi-trailer, a box truck, a heavy duty truck and a boat.

9. The around view monitoring system according to claim 1, further comprising:
    a Universal Asynchronous Receiver/Transmitter (UART) interface connected to the integrated control unit and a Control Area Network Bus (CAN Bus) of the vehicle, and configured to control the integrated control unit to receive vehicle information from the CAN Bus of the vehicle through the UART interface.

10. The around view monitoring system according to claim 1, further comprising:
    a micro-controller unit connected to the integrated control unit through a UART interface, and comprising a storage unit configured to store the calibrated relevant parameters of the vehicle.

11. The around view monitoring system according to claim 1, wherein the transmission interface is a Universal Serial Bus (USB) interface.

12. The around view monitoring system according to claim 1, further comprising:
    a storage unit connected to the integrated control unit, and configured to store the predetermined relevant parameters and the calibrated relevant parameters of the vehicle.

13. The around view monitoring system according to claim 1, further comprising:
    a multimedia device, connected to the integrated control unit and configured to display a user interface so as to display the corresponding around view monitoring images and provide selection of various around view monitoring images.

14. The around view monitoring system according to claim 1, wherein the calibrated relevant parameters of the vehicle at least comprise the type of the vehicle, the size of a calibrated site after calibration, the size of a calibrated pattern after calibration and a calibration result.

15. The around view monitoring system according to claim 1, wherein the predetermined relevant parameters of the vehicle at least comprise the type of the vehicle, the size of the calibrated site and the size of the calibrated pattern.

16. The around view monitoring system according to claim 1, wherein the type of the vehicle at least comprises a bus, a semi-trailer, a box truck, a heavy duty truck and a boat.

* * * * *